United States Patent
Kamps et al.

(10) Patent No.: US 10,427,815 B2
(45) Date of Patent: Oct. 1, 2019

(54) METHOD AND DEVICE FOR PRODUCING PACKAGES

(71) Applicant: KHS GmbH, Dortmund (DE)

(72) Inventors: Sebastian Kamps, Goch (DE); Thomas Nitsch, Kleve (DE); Stefan Van Heukelum, Kranenburg (DE)

(73) Assignee: KHS GmbH, Dortmund (DE)

( * ) Notice: Subject to any disclaimer, the term of this patent is extended or adjusted under 35 U.S.C. 154(b) by 501 days.

(21) Appl. No.: 14/915,350

(22) PCT Filed: Aug. 20, 2014

(86) PCT No.: PCT/EP2014/067709
§ 371 (c)(1),
(2) Date: Feb. 29, 2016

(87) PCT Pub. No.: WO2015/028362
PCT Pub. Date: Mar. 5, 2015

(65) Prior Publication Data
US 2016/0207650 A1    Jul. 21, 2016

(30) Foreign Application Priority Data

Aug. 28, 2013  (DE) .................. 10 2013 109 305

(51) Int. Cl.
| B65B 21/06 | (2006.01) |
| B65B 17/02 | (2006.01) |
| B65B 35/36 | (2006.01) |
| B65B 63/02 | (2006.01) |

(52) U.S. Cl.
CPC .............. B65B 17/02 (2013.01); B65B 21/06 (2013.01); B65B 35/36 (2013.01); B65B 63/02 (2013.01)

(58) Field of Classification Search
CPC ......... B65B 17/02; B65B 35/36; B65B 63/02; B65B 21/06
USPC .......................................................... 156/60
See application file for complete search history.

(56) References Cited

U.S. PATENT DOCUMENTS

| 4,078,357 | A  | * | 3/1978 | Ida .......................... B65B 17/02 |
|           |    |   |        | 156/561 |
| 7,726,464 | B2 | * | 6/2010 | Cerf ..................... B65G 47/088 |
|           |    |   |        | 198/419.3 |
| 9,604,743 | B2 | * | 3/2017 | Nitsch ..................... B65B 17/02 |
| 9,637,256 | B2 | * | 5/2017 | Van Wickeren ........ B65B 17/02 |
| 2010/0154356 | A1 | * | 6/2010 | Elsperger .............. B65B 17/025 |
|           |    |   |        | 53/398 |
| 2015/0191263 | A1 | * | 7/2015 | Nitsch ..................... B65B 17/02 |
|           |    |   |        | 156/556 |

FOREIGN PATENT DOCUMENTS

| DE | 10 2009 025824 | 11/2010 |
| DE | 2 258 625 | 12/2010 |
| DE | 10 2012 005925 | 11/2012 |
| DE | 10 2012 100 810 | 6/2013 |

* cited by examiner

Primary Examiner — Michael N Orlando
Assistant Examiner — Christian Roldan
(74) Attorney, Agent, or Firm — Occhiuti & Rohlicek LLP (57) ABSTRACT

A method for producing a container package includes forming container streams in which the containers have had adhesive applied thereto, separating the containers into container groups, with a container from each stream being in the group, and pressing the containers together from the side by using a pair of clamps so that the adhesive binds the containers together to form the container package.

20 Claims, 6 Drawing Sheets

METHOD AND DEVICE FOR PRODUCING PACKAGES

RELATED APPLICATIONS

This is the national stage, under 35 USC 371, of PCT application PCT/EP2014/067709, filed on Aug. 20, 2014, which claims the benefit of the Aug. 28, 2013 priority date of German application DE 102013109305.1, the contents of which are herein incorporated by reference.

FIELD OF INVENTION

The invention relates to packaging, and in particular, to forming container groups.

BACKGROUND

Containers are often sold in units that include multiple containers. These containers must be held together in some way.

A known way to hold containers together is by using an adhesive. In order to form such units, it is necessary to compress containers against each other to promote adhesive bonding.

SUMMARY

In one aspect, the invention features a method for producing a container package. Such a method includes receiving a first and second lanes of streaming containers at a container inlet of a packaging device, and applying adhesive to the containers at corresponding first and second treatment sections. This is followed by placing containers from the two treatment sections onto a transport section to form two lanes of containers. Once on the transport section, the containers are separated into container groups, each of which includes a container from each of the two lanes. This occurs as the containers move along the transport direction on the transport section. Additionally, the containers are pressed together, or compressed, so that the adhesive that was applied to the containers at the first and second treatment stations binds the containers in the container group to form a container package. The act of separating the containers is carried out by using first and second clamp heads that face each other across the transport section. These clamp heads move together along the transport section. The act of compressing, or pressing, the containers together includes pressing a container in one lane using the first clamp head and pressing the container in another lane using the second clamp head.

In some practices, each treatment section comprises a container inlet. In these practices, the method further includes, at each of the container inlets, receiving a container stream.

Other practices of the method include combining the first clamp head with at least one other clamp head to form a first clamp unit, and combining the second clamp head with at least one other clamp head to form a second clamp unit. In this practice, all clamp heads in a particular clamp unit move together. Among the practices of the invention are those in which forming the clamp units includes forming clamp units that each consist of three clamp heads.

In other practices of the invention, each container has a container axis that defines a radial direction. In these practices, compressing includes causing the clamp heads to press along radial directions of their respective containers.

Other practices of the invention include causing the first and second clamp heads to follow corresponding first and second peripheral loops, each of which has an inner path section that extends along a corresponding side of the transport section. Among these practices are those in which causing either one of the clamp heads to follow a peripheral loop includes causing it to follow a first guide rail.

Practices of the invention also include moving the clamp heads using a mechanical drive, moving them using an electrical linear drive, and individually controlling the motions of the clamp heads so that different clamp heads can move at different speeds.

In another aspect, the invention features an apparatus for forming a container package. Such an apparatus includes a container inlet that has been configured for receiving a two-lane container stream, and first and second treatment sections that receive each lane. Each treatment section has adhesive applicators for applying adhesive to a container. A transport section following the first and second treatment sections conveys another two-lane container stream along a transport direction. Moving along this transport section, also in the transport direction, are clamp heads. These clamp heads cooperate to separate containers moving along the transport direction into container groups. Each clamp head has a container holder configured to grip a container on a surface thereof. The clamp heads are organized in pairs so that first and second clamp heads of a pair are disposed to move together along the transport section opposite each other. The first and second clamp heads of a pair cooperate to compress containers in a container group together so that adhesive applied to the containers binds the containers together to form the container package.

Some embodiments include clamp units, each of which has two or more clamp heads. In these embodiments, the first and second clamp heads are constituents of corresponding first and second clamp units that face each other across the transport section. These two clamp units, and hence their constituent clamp heads, move along the transport direction together. Among these embodiments are those in which each clamp unit has no more than three clamp heads. Also among these embodiments are those in which the first clamp head interacts with a chain that forms a mechanical drive for moving the first clamp unit.

Other embodiments include closed paths on either side of the transport section, each of which has an inner section that extends along the transport section. In these embodiments, clamp heads move along respective closed paths.

Some embodiments have a mechanical drive to move the clamp heads. A typical mechanical drive includes a belt and a cog wheel. In these embodiments, clamp heads being driven by the mechanical drive interact with a cog wheel when the clamp heads traverse a diversion section of a path. In particular, prior to entering the diversion section, a clamp head moves in a first direction. After having left the diversion section, the clamp head moves in a second direction that is different from the first direction.

Other embodiments have an electric linear drive in which the clamp heads are armatures.

In some embodiments, the first clamp head has a headpiece and either a trolley or a carriage that is guided on a guide rail. In these embodiments, the head piece forms a container holder and is configured to be slid in a controlled manner and guided on the carriage or trolley for executing a delivery and clamping movement. The headpiece defines a format part that is exchangeable with other format parts for accommodating at least one of different containers and different forms of container groups. Among these embodiments are those having a cam configured to control the delivery and clamping movement. In these embodiments a pilot pin is attached to the headpiece, and wherein the pilot pin engages the cam.

As used herein, "contact adhesive" means an adhesive that is self-adhesive and that produces an adhesive connection by pressing. A contact adhesive is sometimes called a self-bonder.

Further developments, advantages, and application possibilities of the invention are also derived from the following description of exemplary embodiments and from the figures. Moreover, all characteristics described and/or illustrated individually or in any combination are basically the subject of the invention, regardless of their inclusion in the claims or reference to them. The content of the claims is also an integral part of the description.

As used herein, expressions such as "substantially" or "approximately" refer to deviations from a exact value of ±10%, preferably ±5% and/or deviations in the form of changes that are not significant for function.

BRIEF DESCRIPTION OF THE DRAWINGS

These and other features of the invention will be apparent from the following detailed description and the accompanying figures, in which.

DETAILED DESCRIPTION

Figure 1:
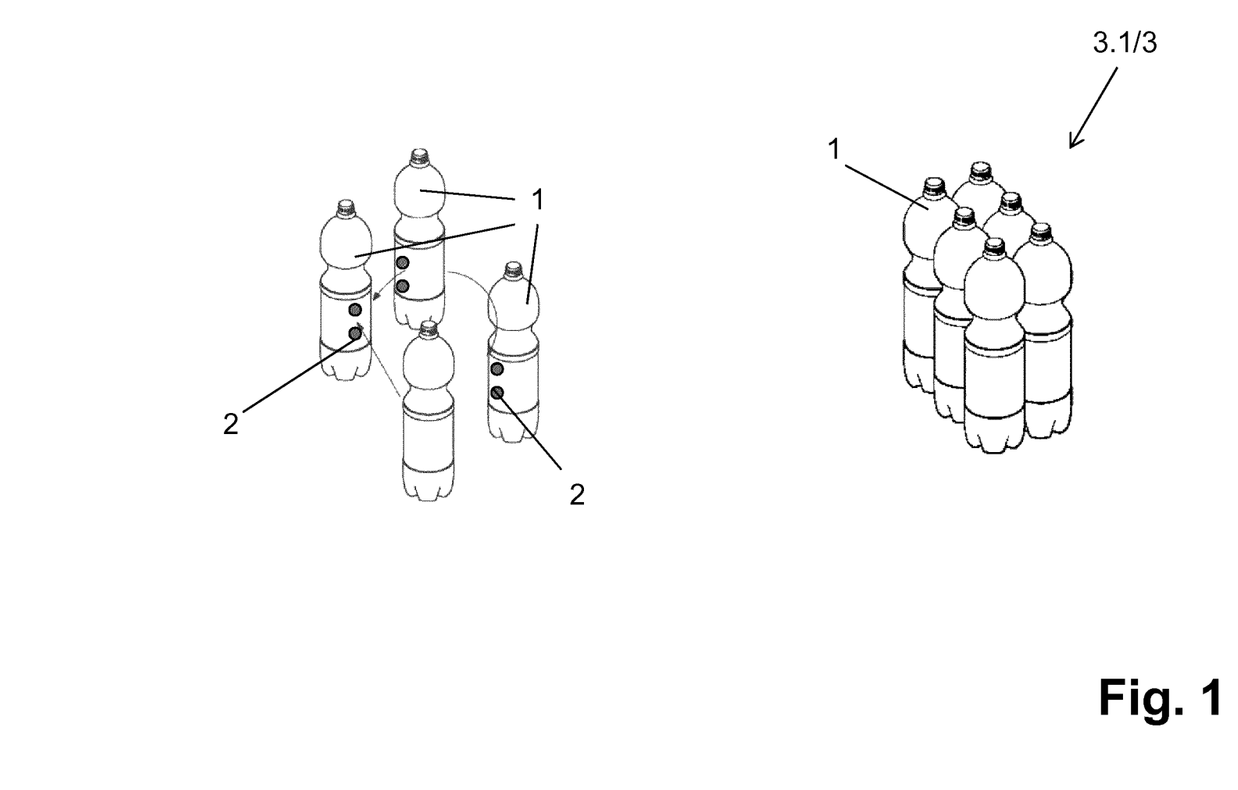
FIG. 1 shows a package comprising multiple containers connected contact adhesive.

FIG. 1 shows containers 1 that have been filled and sealed. In the illustrated embodiment, the containers 1 are bottles, and in particular, bottles that have been blow-molded from a plastic, such as PET (polyethylene terephthalate).

Also shown in FIG. 1 is a container group 3.1 made from multiple containers. The illustrated container group 3.1 has six containers 1 that have been arranged in two rows of three containers 1 that lie against each other. Adhesive spots 2 connect the containers 1 to form a package 3. The adhesive spots 2, which are typically contact adhesive, are applied to those regions of the container's surface that touch other containers 1 in the compressed container group 3.1.

Figure 2:
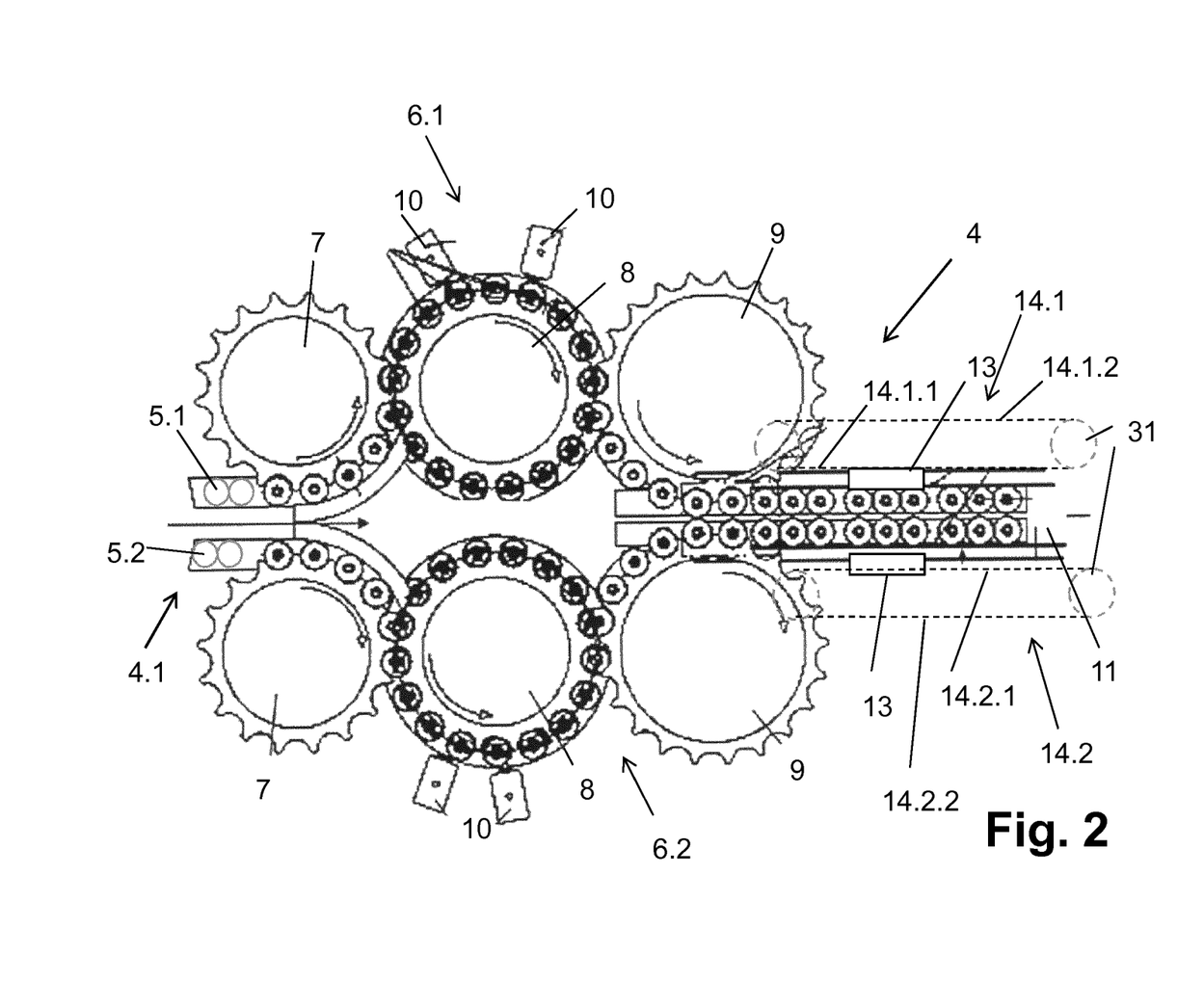
FIG. 2 shows a device for producing the packages shown in FIG. 1.

FIG. 2 shows a packaging device 4 that produces the packages 3 from the containers 1. The packaging device 4 receives first and second container streams 5.1, 5.2 of containers 1 that have been fed standing upright to a container inlet 4.1 thereof. The containers 1 are tightly pressed against each other in a first transport direction A.

A first treatment station 6.1 receives containers from the first container stream 5.1 and a second treatment section 6.2 receives containers from the second container stream 5.2. In the illustrated embodiment, the first and second treatment sections 6.1, 6.2 are identical but disposed to have mirror-symmetry about a vertical central plane. Each treatment section 6.1, 6.2 includes an inlet star 7, a treatment star 8, and an outlet star 9, all of which rotate about a vertical axis and have container holders around circumferences thereof.

Each treatment section 6.1, 6.2 also includes application heads 10 for applying adhesive spots 2. The application heads 10 are adjacent to and do not move with the treatment star 8. Some containers require multiple adhesive spots 2. To achieve this, there can be multiple application heads 10 separated from each other along the treatment star's direction of rotation.

The container holders on the treatment star 8 permit controlled pivoting or rotation of a container 1 about a vertical container axis thereof. This controlled motion enables an application head 10 to apply an adhesive spot 2 to the correct position on the container's surface.

Once adhesive spots have been applied to a container at the treatment star, the transport star 9 places the container, with its adhesive spots 2, on a transport section 11. The transport section 11 transports two lanes of containers 1, one from each of the two treatment sections 6.1, 6.2, along a second transport direction B. In the illustrated embodiment, the second transport direction B is the same as the first transport direction A.

In the illustrated embodiment, containers 1 from the first treatment section 6.1 form a first lane and containers 1 from the second treatment section 6.2 form a second lane on the transport section 11. The container group 3.1 described in connection with FIG. 1 is formed on the transport section 11 with its rows extending along the second transport direction B. Each container group 3.1 is spaced apart from its neighboring container groups in the second transport direction B.

Figure 3:
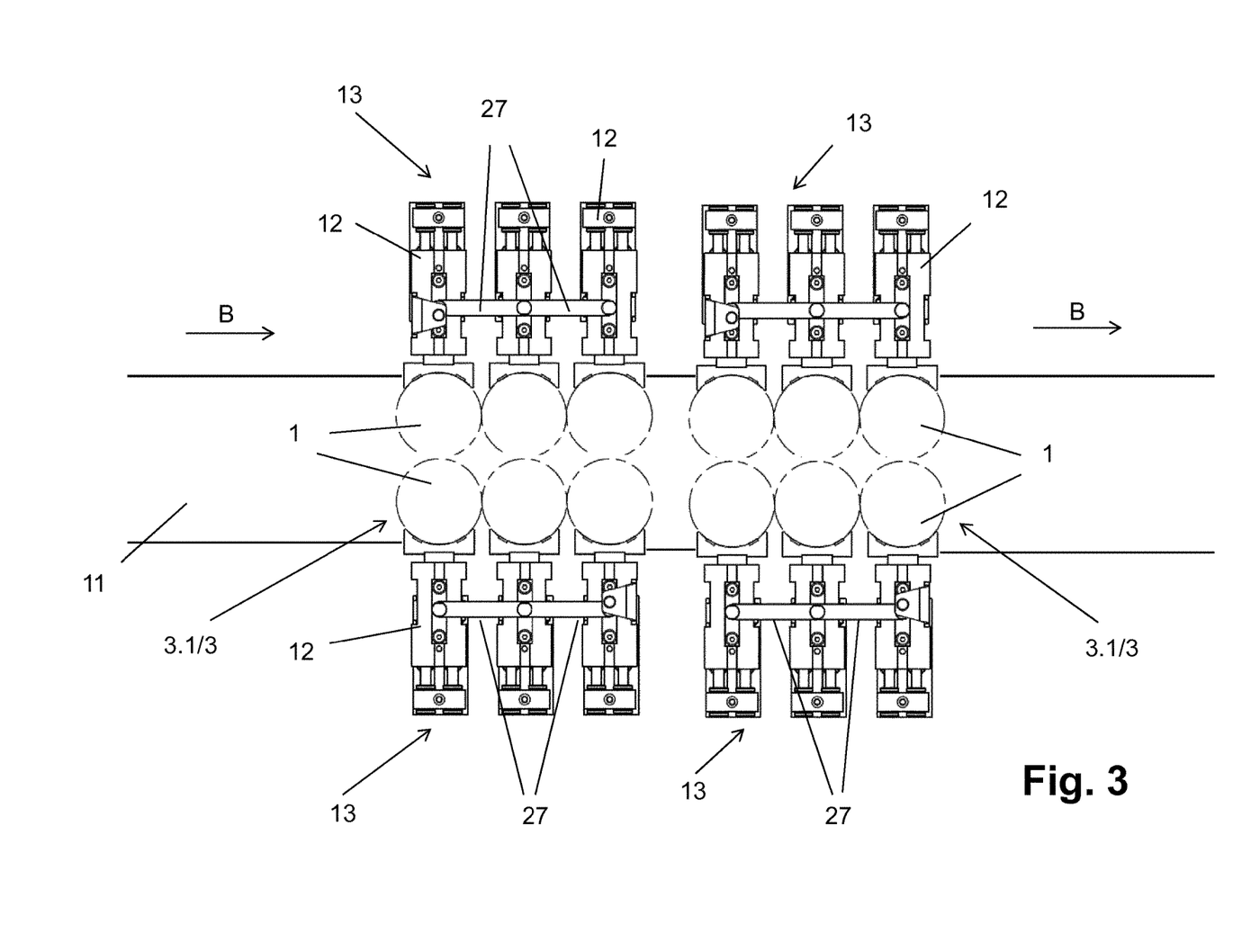
FIG. 3 is a top view of multiple clamp heads of the device in FIG. 2 that are moved along a transport section with the containers.

Referring now to FIG. 3, first and second clamp units 13 lie adjacent to the transport section 11 on opposite sides thereof. Each clamp unit 13 has a number of clamp heads 12 that is equal to the number of containers in a row. As a container group 3.1 travels along the transport section 11, the clamp heads 12 compress the container group 3.1 along both the second transport direction B and perpendicular to the second transport direction B. This ensures that the adhesive spots 2 bond containers 1 to each other.

Referring now to FIG. 2, each clamp unit 13 moves on a corresponding first and second peripheral loop 14.1, 14.2. Each of the first and second peripheral loops 14.1, 14.2 extends along the side of the transport section 11. The first peripheral loop 14.1 has an inner path 14.1.1 and an outer path 14.1.2 separated by a diversion regions defined by cog wheels 31. Similarly, the second peripheral loop 14.2 has an inner path 14.2.1 and an outer path 14.2.2 separated by diversion regions defined by cog wheels 31.

As a clamp unit 13 moves along the first peripheral loop 14.1 another clamp unit directly opposite also moves along the second peripheral loop 14.2. The two clamp units 13 move in synchrony.

Figure 6:
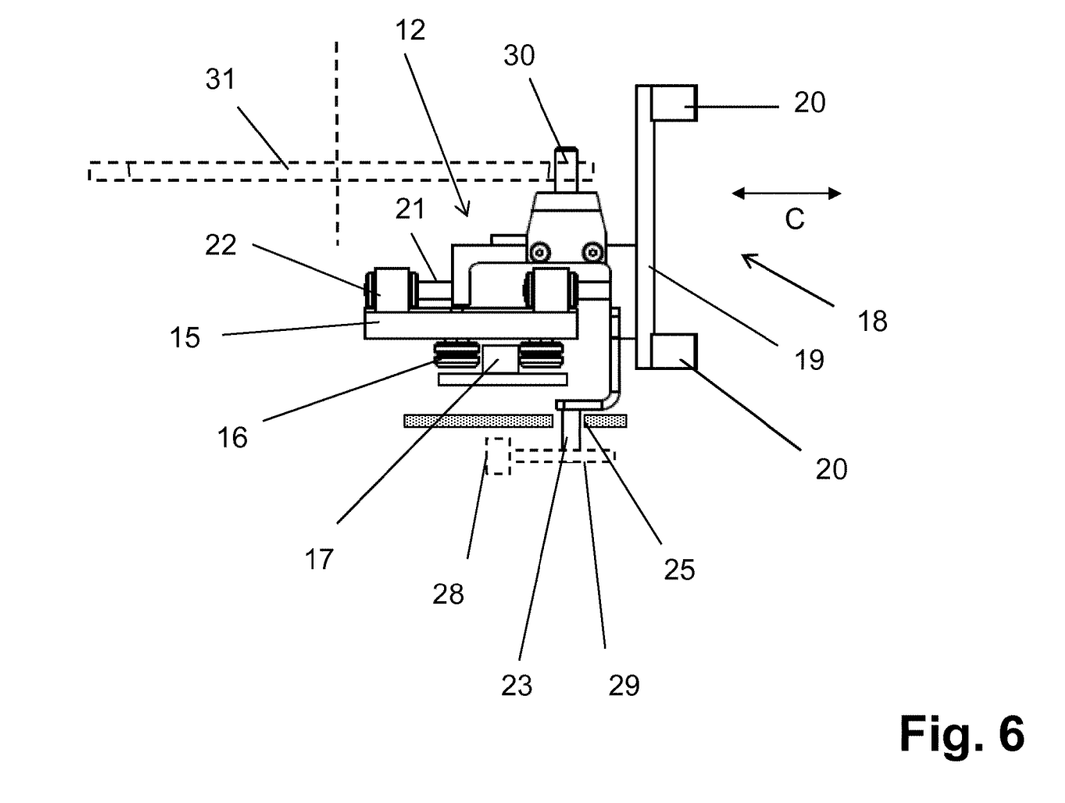

Referring now to FIG. 6, a typical clamp head 12 includes a carriage 15 having guide rollers 16 on an underside thereof. A guide rail 17 guides the carriage 15. The course of the guide rail 17 corresponds to the first and second peripheral loops 14.1, 14.2.

The carriage 15 carries a strip-like headpiece 19 that moves horizontally in a clamping direction C that is perpendicular to the second transport direction B. In the illustrated embodiment, the headpiece 19 protrudes over a side of the clamp head 12 or of the carriage 15 turned towards the transport section 11.

The headpiece 19 includes two container holders 20 that are adapted to the diameter of the containers 1. These container holders 20 are spaced apart from each other in the vertical direction so that they can hold a container 1 over part of its circumference at two vertically separated regions of the container 1. In the illustrated embodiment, the container holders 20 hold the container 1 over less than half of its circumference.

Two parallel guide rods 21 extend from a rear surface of the headpiece 19. These guide rods 21 cause the headpiece 19 to engage in a delivery and clamping movement in the clamping direction C. Each guide rod 21 has one secured end. A pair of corresponding guides 22 on the carriage 15 guides the motion of the guide rods 21.

The headpiece 19, together with its container holders 20 and guide rods 21, forms a modular format part 18 that can be swapped out for another format part 18 when the packaging device 4 is switched over to process different kinds of containers 1 with a different container diameter and/or shapes.

Figure 5:
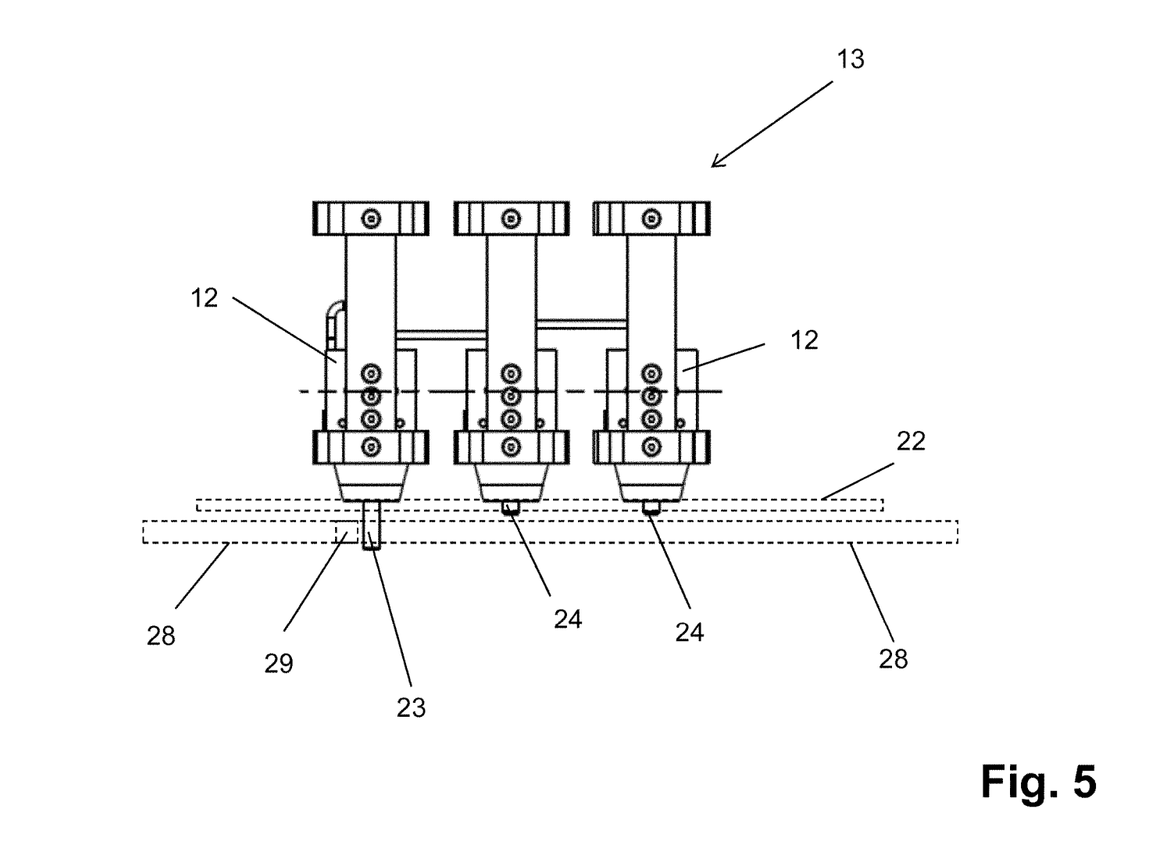

First and second pilot pins 23, 24, best seen in FIG. 5, facilitate controlled delivery and movement of a clamp head 12 in the clamping direction C. These first and second pilot pins 23, 24 protrude downwards, with the first pilot pin 23 protruding further than the second pilot pin 24.

As the clamp unit 13 moves along the inner path 14.1.1, 14.2.1, it engages a guide cam 25. The course of each guide cam 25 is selected such that, before containers have been transferred from the transport star 9 to the transport section 11, the headpieces 19 are initially outside the transport section 11 or the movement path of the containers 1. As the clamp unit 13 proceeds along the inner path 14.1.1, 14.2.1, the guide cam 25 gradually moves the clamp units 13 toward the transport section 11. In the end, all containers 1 forming a particular container group 3.1 are between two clamp units 13 lying on opposite sides of the transport section 11, and in particular, between the clamp heads 12 or the headpieces 19 thereof. This permits the containers 1 in a container group 3.1 to be gripped and pressed against each other.

In some cases, the containers 1 are elastically deformable, at least within limits. Examples of such containers include those made of plastic. When such containers are used, a slight deformation of one or more containers occurs when clamp heads 22 clamp against the containers 1. This causes a reciprocal clamping of those containers in the container group 3.1 that are next to each other in the second transport direction B. As a result, it is possible to promote a reliable adhesive connection between containers 1 that are next to each other along the second transport direction B.

In some embodiments, a similar effect can be achieved by arranging the guides 22, and in particular the guides on the two outer clamp heads 12 of each clamp unit 13, such that the clamp heads 12 move along a direction that has a component both in the clamping direction C and in the second transport direction B.

As the clamp units 13 move further along the inner path 14.1.1, 14.2.1 after having compressed the containers in the container group 13.1, the distance between the guide cams 25 and the transport section 11 increases. As a result, the guide cams 25 on either side of the transport section 11 cause the clamp units 13 on either side of the transport section 11 to veer outward away from each other. This causes the headpieces 19 to release the containers.

When forming container groups 3.1 from containers 1 provided by the transport stars 9, a clamp head 12 or a headpiece 19 thereof engages a container 1 as it comes off a transport star 9 and carries that container along the second transport direction B. It does so at a speed that is slightly greater than the transport speed at which the containers 1 are fed to the transport section 11. This spaces container groups 3.1 from each other along the second transport direction B.

Two clamp units 13 arranged opposite each other on the two sides of the transport section 11 compress the containers 1 against each other to form container groups 3.1. Pairs of clamp heads 12 from these clamp units 13 face each other across the second transport direction B.

A friction material 26 on the container-contact surfaces of the container holders 20 helps prevent unwanted twisting of the containers 1 during compression of a container group 3.1. This friction material 26 generates increased friction between a particular container 1 and its container holder 20.

Figure 4:
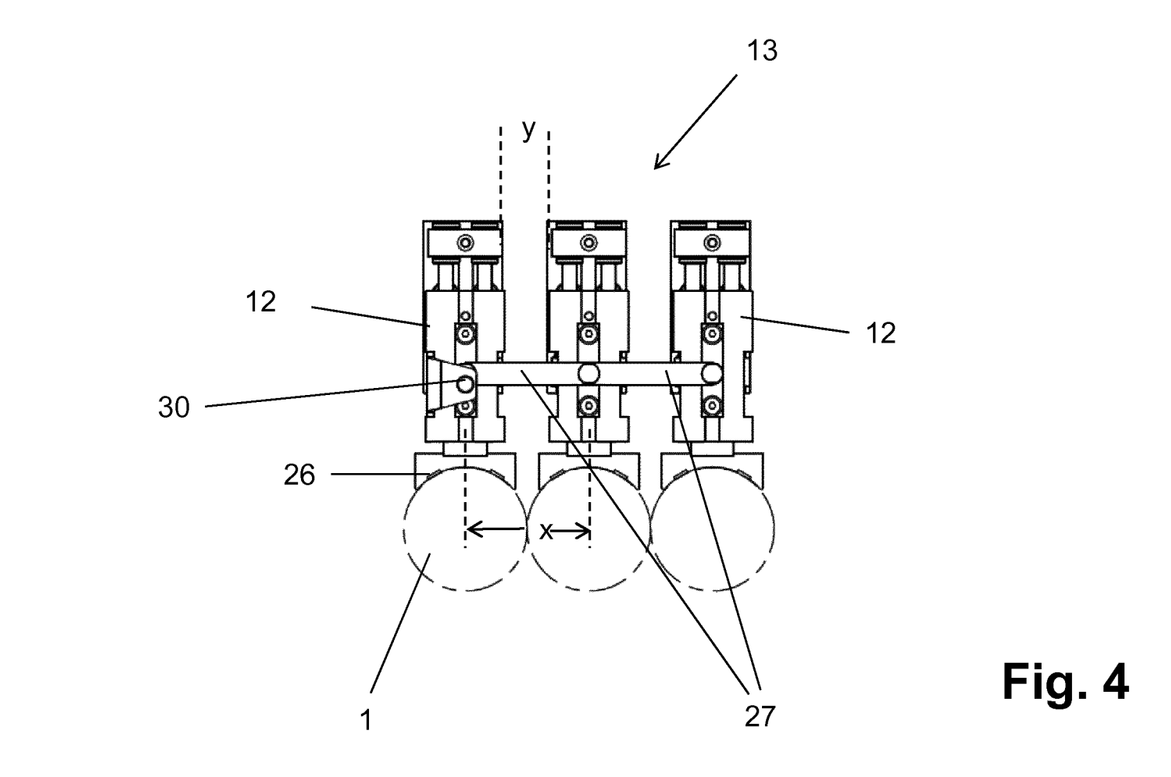
FIGS. 4-6 show different views of a clamp unit made of three clamp heads.

In the illustrated embodiment, three clamp heads 12 combine to form a clamp unit 13. As shown in FIG. 4, a pair of connecting pieces 27 extends along the tops of the clamp heads 12. These connecting pieces 27 connect clamp heads 12 together in an articulated manner to form the clamp unit 13. The connecting pieces 27 are selected such that an axial distance x between the clamp heads 12, or their holders 20, corresponds to the diameter of one container 1.

Moreover, clamp heads 12 adjacent to each other, or their corresponding carriages 15, are spaced apart from each other by a distance y selected to guarantee that the clamp units 13 will be able to go around curves at the ends of the first and second peripheral loops 14.1, 14.2.

A rotating rigid chain 28 drives the clamp units 13 away from a transfer region near the transport stars 9 along the inner paths 14.1.1, 14.2.1 and drives them back towards the transport stars 9 via the outer paths 14.1.2, 14.2.2, on which the clamp units 13 are returned to the transfer regions. The chain 28 includes push links 29 at locations corresponding to the locations of the clamp units 13. The first pilot pin 23 protrudes downwards over the guide cam 25 far enough so that the push link 29 can grasp it. In the illustrated embodiment, the first pilot pin 23 is provided on the subsequent clamp head 12 of each clamp unit 13 relative to the second transport direction B.

Referring now to FIG. 6, a third pilot pin 30 protrudes upward from a top of a clamp head 12 of each clamp unit 13. In the illustrated embodiment this is the next clamp head 12 of each clamp unit 13 relative to second transport direction B. When the clamp unit 13 reaches a diversion region, the third pilot pin 30 engages the teeth of the cog wheel 31 at that diversion region. As the cog wheel 31 rotates, it uses the third pilot pin 30 to drive the clamp unit 13.

Meanwhile, when the chain 28 reaches the cog wheel 31, it traverses a path such that the first pilot pin 23 no longer engages the push links 29. As a result, when traversing the diversion regions of the first and second peripheral loops 14.1, 14.2, the clamp unit 13 moves only under the influence of the cog wheel 31. This also results in perfect synchrony between the movement of the clamp unit 13 and the transport star 9 when the clamp unit 13 is in the region of the transport section 11 on the transport stars 9.

A variety of different implementations of the connecting pieces 27 is possible. In some embodiments, the connecting pieces 27 are connecting rods. In others, the connecting pieces 27 are hydraulic or pneumatic cylinders.

Other measures are also possible to achieve a compression of the container group 3.1 in the second transport direction B. For example, in one method, when headpieces 19 move in the clamping direction C, there is also a reduction in the distance y between the clamp heads 12 of the clamp unit 13. In another method, clamping of the containers 1 in the second transport direction B or against the second transport direction B can be achieved by making the axial distance x separating the container holders 20 from each other be slightly smaller than the diameters of the containers 1.

Some embodiments directly transfer containers 1 from the treatment star 8 by the peripheral path 14 or by clamp units 13 arranged along the peripheral path 14 in combination with the foregoing elements and functions. Such embodiments omit the transport star 9.

In all of the foregoing embodiments, it is useful to provide a curved or opposing guard-rail through to the crosswise approach to the opposite container stream. Such a curved or opposing guard-rail prevents the containers from rolling off. In some embodiments, the guard-rail includes rollers. In others, it includes an endlessly rotating belt.

In the embodiments described above, a mechanical drive moves the clamp units 13. In particular, the clamp units 13 engage chains 28 and cog wheels 31.

However, this is not the only way to drive the clamp units 13. In a further embodiment, at least one clamp head 12 of each clamp unit 13 is a circulating armature of an electric linear motor. In these embodiments, it is possible to implement individual control over individual clamp units 13. Another advantage of using an electric linear motor is a reduction in the number of clamp units 13 that are needed. This is because returning clamp units 13 can be accelerated as they traverse the outer paths 14.1.2, 14.2.2.

Yet another advantage of an embodiment that uses an electric linear drive is that it is no longer necessary to connect the clamp heads 12 mechanically to a clamp unit 13. Instead, individual clamp heads 12 can be brought together to dynamically form clamp units 13 on an as-needed basis.

For example, a particular clamp unit 13 might exist only until the compression of the container groups 3.1, or until the production of the packages 3, while in the next pass the same clamp heads 12 are put together in a different way to form different clamp units 13. This permits considerable flexibility in the use of the clamp heads 12, and potentially reduces the number of these clamp heads 12 needed in the packaging device 4.

A clamp head 12 that is an armature of a linear drive preferably includes a drive winding. Along the first and second peripheral loops 14.1, 14.2, corresponding magnetic windings or permanent magnets form magnetic poles of changing polarity.

In those cases in which the clamp heads 12 are part of a linear drive, it is possible to control compression of the container group 3.1 along the second transport direction B by individually controlling movement of the clamp heads 12 in second transport direction B and/or against the second transport direction B.

In all embodiments, the headpieces 19 provided at the clamp heads 12 can be replaced quickly and easily whenever a format change is required. This makes it easier to reconfigure the device 4 to accommodate different kinds of containers. In addition, in all the embodiments, clamp heads 12 compress container grips 3.1 and connect containers 1 to each other through exertion of forces directed radially onto the containers 1, thus pressing containers 1 that lie opposite each other against each other. Additionally, the clamp heads 12 exert, by appropriate means, a force directed onto the containers 1 such that adjacent containers, which are held between two clamp units 13 lying opposite each other, are pressed against each other.

The invention claimed is:

1. An apparatus for forming a container package, said apparatus comprising a guide rail, a container inlet, a first container treatment section, a second container treatment section, a first adhesive-applicator, a second adhesive-applicator, a transport section, a first clamp head, and a second clamp head, wherein said container inlet is configured for receiving a two-lane container stream, wherein said first treatment section receives a first lane of said container stream, wherein said second treatment section receives a second lane of said container stream, wherein said first adhesive applicator is configured to apply adhesive to containers in said first treatment section, wherein said second adhesive applicator is configured to apply adhesive to containers in said second treatment section, wherein said transport section follows said first and second treatment section, wherein said transport section conveys an at least two-lane container stream along a transport direction, wherein said first clamp head and said second clamp head cooperate to separate containers moving along said transport direction into container groups, wherein, in operation, said first and second clamp heads each comprise a container holder configured to grip a container on a surface thereof, wherein said first and second clamp heads are disposed to move together along said transport section opposite each other, wherein said first and second clamp heads are configured to cooperate to compress containers in a container group together so that adhesive applied to said containers binds said containers together to form said container package, wherein said clamp head comprises a headpiece that forms said container holder and a trolley that is guided on said guide rail, said headpiece being configured to be slid in a controlled manner and guided on said trolley for executing a delivery and clamping movement, and wherein said head piece is exchangeable for other head pieces to accommodate different container formats.

2. The apparatus of claim 1, further comprising a cam and a pilot pin, wherein said cam is configured to control said delivery and clamping movement, wherein said pilot pin is attached to said headpiece, and wherein said pilot pin engages said cam.

3. The apparatus of claim 1, further comprising a first clamp unit comprising a plurality of clamp heads and a second clamp unit comprising a plurality of clamp heads, wherein said first clamp head is a constituent of said first clamp unit, wherein said second clamp head is a constituent of said second clamp unit, wherein clamp heads in said first clamp unit move along said transport direction together and clamp heads in said second clamp unit move along said transport direction together.

4. The apparatus of claim 3, wherein each of said first and second clamp units consists of three clamp heads.

5. The apparatus of claim 3, wherein said first clamp head interacts with a chain that forms a mechanical drive for moving said first clamp unit.

6. The apparatus of claim 1, further comprising a first closed path on a first side of said transport section and a second closed path on a second side of said transport section, wherein said first clamp head moves along said first closed path, wherein said second clamp head moves along said second closed path, wherein said first closed path comprises an inner section that extends along said first side of said transport section, and wherein said second closed path comprises an inner section that extends along said second side of said transport section.

7. The apparatus of claim 1, further comprising a chain and a cog wheel, wherein said chain defines a mechanical drive, wherein said mechanical drive is configured to move clamp heads, wherein clamp heads being driven by said mechanical drive interact with said cog wheel when said clamp heads traverse a diversion section of a path, wherein prior to entering said diversion section, a clamp head moves in a first direction, wherein after having left said diversion section, said clamp head moves in a second direction, and wherein said first and second directions are different.

8. The apparatus of claim 1, further comprising an electric linear drive, wherein said electric linear drive comprises a first armature, wherein said first clamp head is a constituent of said first armature, wherein said electric linear drive comprises a second armature, and wherein said second armature comprises said second clamp head.

9. The apparatus of claim 1, wherein each of said container treatment sections comprises a container inlet that receives a container stream.

10. The apparatus of claim 1, wherein said first clamp head is configured to move along a first direction towards a first container, wherein said second clamp head is configured to move along a second direction towards a second container, and wherein said first direction is a direction that is opposite to said second direction.

11. The apparatus of claim 1, wherein said first clamp head is configured to follow a first peripheral loop that comprises an inner path section that extends along a first side of said transport section and wherein said second clamp head is configured to follow a second peripheral loop that comprises an inner path section that extends along a second side of said transport section.

12. The apparatus of claim 1, further comprising a first guide rail, a first peripheral loop, and a second peripheral loop, wherein said first clamp head is configured to follow said first guide rail along said first peripheral loop, wherein said first peripheral loop comprises an inner path section that extends along a first side of said transport section and wherein said second clamp head is configured to follow said second peripheral loop, wherein said second peripheral loop comprises an inner path section that extends along a second side of said transport section.

13. The apparatus of claim 1, further comprising a mechanical drive, wherein said mechanical drive is configured to move said first and second clamp heads.

14. The apparatus of claim 1, where said first and second clamp heads are configured to move with different speeds.

15. The apparatus of claim 1, further comprising a clamp unit comprising a plurality of clamp heads, wherein said clamp unit is configured to come into existence at the beginning of a first interval of operation and wherein said clamp unit is configured to cease to exist during a second interval of operation.

16. The apparatus of claim 1, further comprising a plurality of clamp heads, wherein said first and second clamp heads are constituents of said plurality, and wherein, during operation of said apparatus, said first and second clamp heads belong to the same clamp unit and said first and second clamp heads belong to different clamp units.

17. The apparatus of claim 1, wherein said first and second clamp heads belong to a clamp unit and wherein said first and second clamp heads are disconnected from each other.

18. An apparatus for forming a container package, said apparatus comprising a format part, a guide rail, a headpiece, a container holder, a container inlet, a first container treatment section, a second container treatment section, a first adhesive-applicator, a second adhesive-applicator, a transport section, a first clamp head, a second clamp head, and a carriage, wherein said first clamp head comprises said headpiece and said carriage, wherein said container inlet is configured for receiving a two-lane container stream, wherein said first treatment section receives a first lane of said container stream, wherein said second treatment section receives a second lane of said container stream, wherein said first adhesive applicator is configured to apply adhesive to containers in said first treatment section, wherein said second adhesive applicator is configured to apply adhesive to containers in said second treatment section, wherein said transport section follows said first and second treatment section, wherein said transport section conveys an at least two-lane container stream along a transport direction, wherein said first clamp head and said second clamp head cooperate to separate containers moving along said transport direction into container groups, wherein, in operation, said first and second clamp heads each comprise a container holder configured to grip a container on a surface thereof, wherein said first and second clamp heads are disposed to move together along said transport section opposite each other, and wherein said first and second clamp heads are configured to cooperate to compress containers in a container group together so that adhesive applied to said containers binds said containers together to form said container package, wherein said carriage is guided on said guide rail, wherein said head piece forms said container holder, wherein said head piece is configured to be slid in a controlled manner and guided on carriage for executing a delivery and clamping movement, wherein said format part is exchangeable with other format parts for accommodating different forms of container groups, and wherein said format part comprises said headpiece.

19. The apparatus of claim 1, wherein said first and second clamping heads are configured to cause containers to exert a force in said transport direction by executing said delivery and clamping movement.

20. A method for using an apparatus for producing a container package, wherein using said apparatus comprises receiving a first lane of streaming containers at a container inlet of a packaging device, at a first treatment section, applying adhesive to containers that were received from said first lane, receiving a second lane of streaming containers at said container inlet of said packaging device, placing containers from said first treatment section onto a first lane of a transport section, at a second treatment section, applying adhesive to containers that were received from said second lane, moving said containers on said first lane of said transport section along a transport direction, placing containers from said second treatment section onto a second lane of said transport section, moving said containers on said second lane of said transport section along said transport direction, separating containers in said first lane and said containers in said second lane into container groups, each of which contains at least one container from said first lane and at least one container from said second lane, as said containers from said first lane and said containers from said second lane move along said transport direction on said transport section, compressing said containers together so that said adhesive that was applied to said containers at said first and second treatment stations binds said containers in said container group to form a container package, wherein separating containers in said first lane and said containers in said second lane into container groups, each of which contains at least one container from said first lane and at least one container from said second lane, comprises using a first clamp head and a second clamp head that faces said first clamp head to grip containers that are being conveyed by said transport section on shell surfaces thereof as said first clamp head and said second clamp head move together along said transport section, and wherein compressing said containers together so that said adhesive that was applied to said containers at said first and second treatment stations binds said containers in said container group to form a container package comprises pressing a container in said first lane using said first clamp head and pressing a container in said second lane using said second clamp head, wherein said apparatus comprises a guide rail, said container inlet, said first and second container-treatment sections, said first and second adhesive-applicators, said transport section, and said first and second clamp heads, wherein said container inlet is configured for receiving a two-lane container stream, wherein said first treatment section receives a first lane of said container stream, wherein said second treatment section receives a second lane of said container stream, wherein said first adhesive applicator is configured to apply adhesive to containers in said first treatment section, wherein said second adhesive applicator is configured to apply adhesive to containers in said second treatment section, wherein said transport section follows said first and second treatment section, wherein said transport section conveys an at least two-lane container stream along a transport direction, wherein said first clamp head and said second clamp head cooperate to separate containers moving along said transport direction into container groups, wherein, in operation, said first and second clamp heads each comprise a container holder configured to grip a container on a surface thereof, wherein said first and second clamp heads are disposed to move together along said transport section opposite each other, and wherein said first and second clamp heads are configured to cooperate to compress containers in a container group together so that adhesive applied to said containers binds said containers together to form said container package, wherein said clamp head comprise a headpiece that forms said container holder and a trolley that is guided on said guide rail, said headpiece being configured to be slid in a controlled manner and guided on said trolley for executing a delivery and clamping movement, and wherein said head piece is exchangeable for other head pieces to accommodate different container formats.

\* \* \* \* \*